INVENTOR
WILLIAM W. LYTH

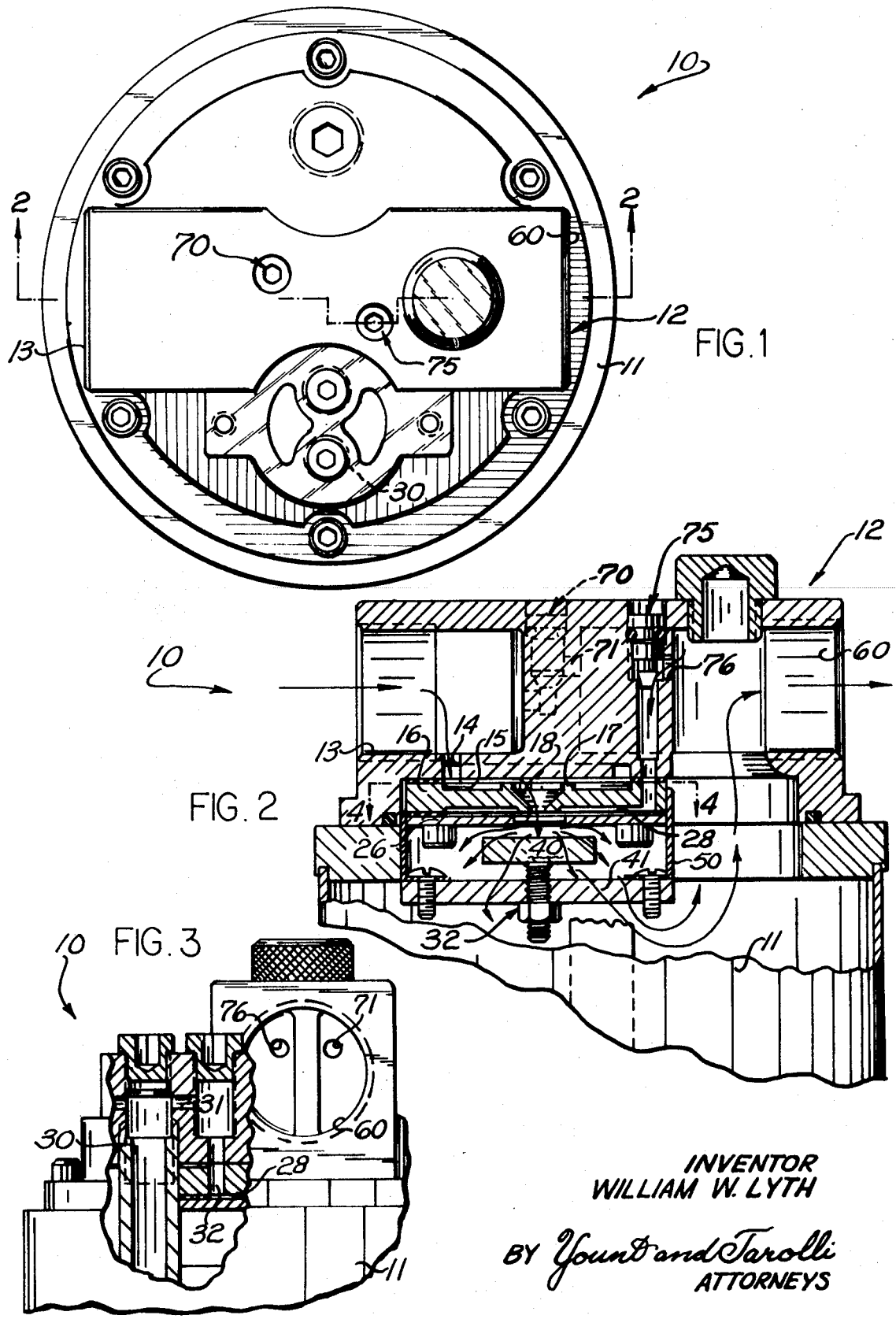

BY Yount and Tarolli
ATTORNEYS

INVENTOR
WILLIAM W. LYTH

BY Yount and Tarolli
ATTORNEYS

United States Patent Office 3,605,942
Patented Sept. 20, 1971

3,605,942
MIST GENERATOR
William W. Lyth, Cleveland, Ohio, assignor to Eaton Yale & Towne Inc., Cleveland, Ohio
Filed May 19, 1969, Ser. No. 825,726
Int. Cl. F16n 7/32
U.S. Cl. 184—6.26
22 Claims

ABSTRACT OF THE DISCLOSURE

A mist generator comprises means defining a vortex chamber having an inlet and an outlet. The vortex chamber creates a rotating flow of fluid which moves in a direction generally axially of the direction of rotation thereof. The rotating flow of fluid moves past an oil gap and draws oil from the oil gap thereinto. As the fluid flows beyond the oil gap, it encounters a mist density adjustment means which is located in the path of the rotating fluid. The mist density adjustment means comprises a particle size regulator disc or member which is adjustable toward and away from the vortex outlet to control the suction which is created by the rotating fluid flow in the oil gap.

---

The present invention relates to an apparatus for generating a liquid particle suspension in a fluid carrier and, more particularly, relates to an oil mist generator which utilizes a vortex chamber for creating a rotating flow of air which moves in a direction generally axially of its direction of rotation and which moves past an oil gap and draws oil thereinto as it moves therepast.

Apparatus for generating an oil mist for purposes of lubricating machinery parts, such as bearings, is well known. Such oil mist generators have been of the venturi type in which oil is aspirated into the throat of a venturi where it is particalized. Such venturi generators have not been completely satisfactory, particularly in view of the fact that it has commonly been necessary to heat the air and oil to relatively high temperatures before generating a mist.

United States application Pat. No. 3,515,676, filed Sept. 18, 1967, in the name of Mannhardt et al. and assigned to the assignee of the present invention discloses an oil mist generator apparatus which operates on a vortex principle. The apparatus includes a vortex chamber which creates a rotating flow of air which moves in a direction generally axially of the direction in which the fluid is rotating. The rotating flow of air then moves past an oil gap and draws oil from the gap thereinto. Due to the action of the rotating flow of air, the oil is particalized to form an air-oil mist which is directed to machinery parts for lubrication thereof. Such mist generators of the vortex design have not been capable of creating sufficient mist density over a reasonable range of flow rates or good control of the density of the mist. Also line wetting has been somewhat of a problem, as well as flooding of the vortex at high flow rate due to the flow of an excessive amount of oil into the oil gap.

It has been discovered that the above-noted problems including the problem of providing a sufficient mist density for a reasonable range of flow rates can be solved by providing an oil gap which has a specific dimensional relationship to the dimension of the vortex outlet. By proper dimensioning the oil gap, a high mist density can be produced over a wide range of flow rates, thus providing an efficient, practical construction. In addition, it has been discovered that the mist density can be controlled by providing an adjustable particle size regulator disc or member which is located in the path of the rotating body of fluid. This member is adjustable toward and away from the vortex outlet and can thereby control the pressure or suction created by rotating the mass of fluid as it flows through the oil gap. The position of the adjustable member can be varied with flow rate changes and the characteristics of the mist which are desired.

Accordingly, the principal object of the present invention is the provision of a new and improved apparatus for generating a liquid particle suspension in a fluid carrier and which includes a vortex chamber for creating a rotating flow of fluid which moves in a direction generally axially of its direction of rotation and which is of a practical efficient construction providing a high density mist for a reasonable range of flow rates with a minimum of line wetting and a minimum possibility of flooding the vortex at high flow rates.

A further object of the present invention is the provision of a new and improved oil mist generator which includes a chamber of the vortex type and which provides a high density mist which can be controlled by adjustment of parts thereof.

A more specific object of the present invention is the provision of a new and improved mist generator of the vortex type in which a mist density adjustment is provided by means located in the path of the rotating flow of fluid and which is movable toward and away from the vortex outlet to effect the adjustment of the mist density.

A further object of the present invention is the provision of a new and improved mist generator of the vortex type, as noted in the next preceding paragraph, wherein the mist density adjustment means consists of a particle size regulator disc or member which is movable toward and away from the vortex chamber and upon movement controls the suction created by the rotating flow of fluid.

A still further object of the present invention is the provision of a new and improved mist generator of the vortex type which includes a means for creating a rotating flow of fluid which moves in a direction generally axially of the direction of rotation thereof and which moves through a liquid gap having a critical dmensional relationship with the vortex outlet and wherein the rotating fluid encounters a particle size regulator as it exits from the oil gap.

Another object of the present invention is the provision of a new and improved mist generator of the vortex type in which oil is flowed into the rotating body of fluid internally of the rotating body of the fluid.

Further objects, advantages, and features of the present invention will be apparent to those skilled in the art to which it relates from the following detailed description of a preferred embodiment of the present invention made with reference to the accompanying drawings in which:

FIG. 1 is a top plan view of an oil mist generator embodying the present invention;

FIG. 2 is a fragmentary sectional view of a mist generator, shown in FIG. 1 taken along the line 2—2 thereof;

FIG. 3 is a side elevational view of the mist generator shown in FIG. 1 with a portion thereof in section;

Figure 5:
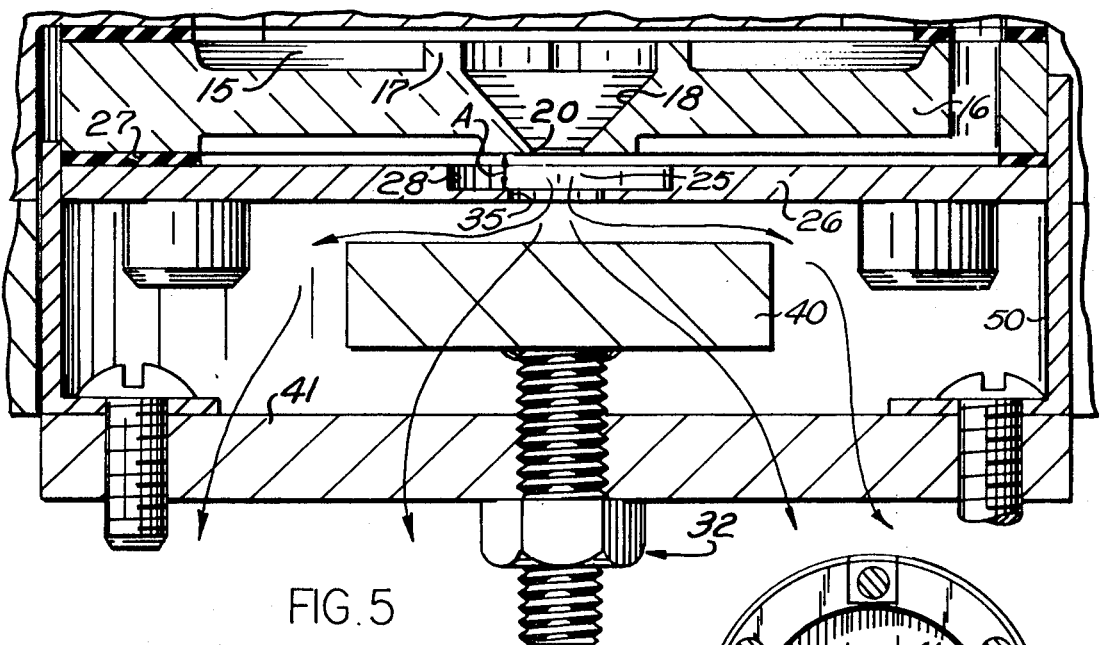
FIG. 5 is an enlarged view showing a portion of the mist generator of FIG. 1.
Figure 4:
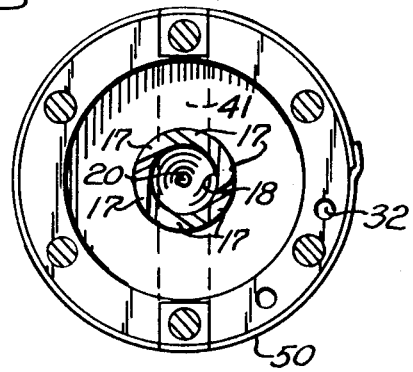
FIG. 4 is a sectional view of the mist generator shown in FIG. 2, taken approximately along the line 4—4 of FIG. 2.
Figure 6:
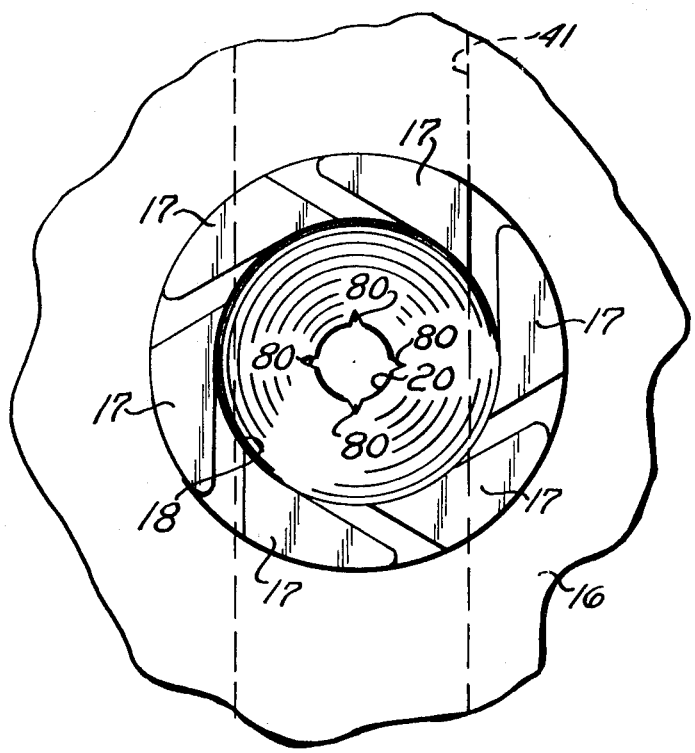
FIG. 6 illustrates a modified construction of the vortex outlet of the present invention.
Figure 7:
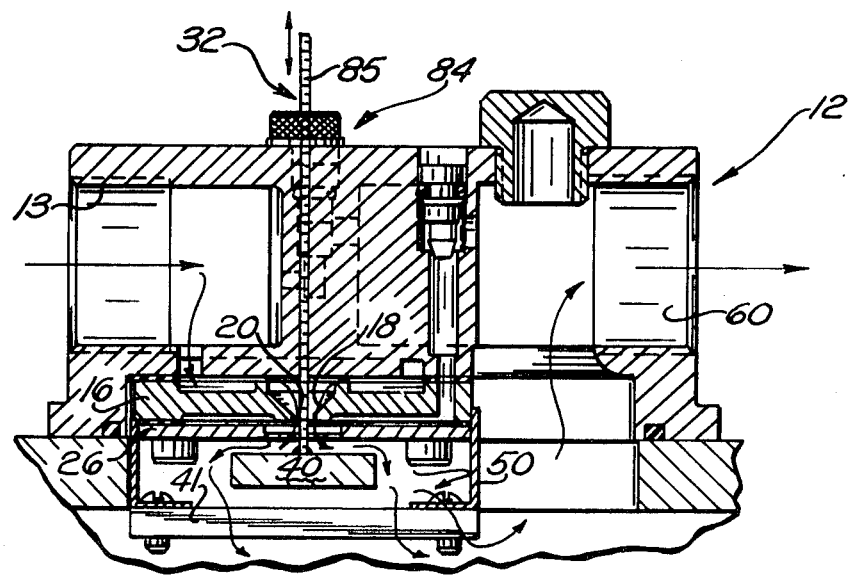
FIG. 7 is a further modified construction of the present invention showing a modified plate usable in the construction of FIG. 2 and also adjustable from outside the unit.
Figure 8:
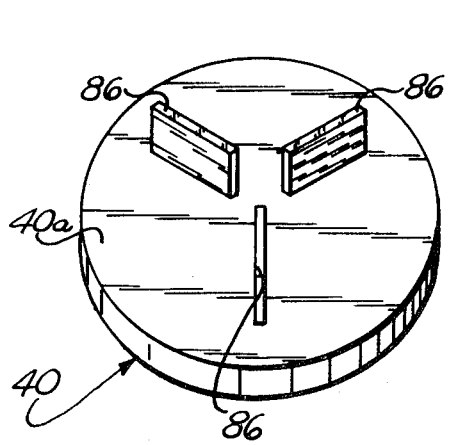
FIG. 8 shows a further modification of the plate of the present invention.

The present invention provides a highly improved apparatus for generating a liquid particle suspension in a fluid carrier. In particular, the present apparatus provides a highly improved oil mist generator which utilizes a vortex chamber for creating a rotating flow of air which moves in a direction generally axially of its direction of rotation. The moving air moves past an oil gap and draws oil thereinto as it moves therethrough. An oil mist generator embodying the present invention is operable to provide a high density oil mist and is constructed so as to permit a control of the density of that mist. Conduit line wetting and flooding of the mist generator, by the drawing of an excessive amount of oil into the vortex chamber at high flow rates, is minimized by such a construction.

As representative of the present invention, FIGS. 1–5 illustrate a mist generator 10. The mist generator 10 generates a liquid particle suspension in a fluid carrier and, in particular, comprises an oil mist generator which generates an oil mist in an air carrier. The oil mist generator is utilized in association with machinery for effecting lubrication of areas or parts of the machinery, such as bearings, etc. A typical lubrication system would include an oil mist generator for supplying mist through a conduit to a condenser fitting. The condenser fitting receives the mist and condenses the lubricant received thereby for supplying the machine part with lubricant. Such a system requires less lubricant to be used since lubricant is continually supplied at a uniform rate. Various condenser fittings may be used dependent on the amount of lubrication required by the machine part without changing the oil mist generator, as is known.

The oil mist generator 10 includes a storage chamber 11 in which a suitable supply of oil is stored. The chamber 11, on the upper end thereof, has a mist generating unit or head 12 supported thereon. The head 12 includes a fluid carrier inlet 13 which is adapted to be communicated with a supply of pressurized air. A suitable pressure regulator, not shown, is supported in the air supply in order to control the pressure of the air delivered into the inlet 13.

Fluid which flows into the inlet 13 is directed through a passageway 14 communicating with the inlet 13 into an air chamber 15. The air chamber 15 is defined in part by a vortex member 16 which is a generally circular or disc-shaped member. The vortex member 16 has a plurality of vanes 17 thereon which are positioned so as to direct the fluid from the air chamber 15 defined in part by the vortex member 16 into a vortex chamber 18. The vortex chamber 18 is a conical chamber which, as it extends downwardly, tapers inwardly toward a vortex chamber outlet 20. The vanes 17 are located so as to direct the air from the chamber 15 tangentially into the chamber 18. As the air is directed therein, due to the conical configuration of the walls thereof, the air is swirled or caused to be swirled due to the shape of the vortex chamber 18. As a result, the air, as it leaves the outlet 20 of the vortex chamber 18, is rotating at a high velocity and moving in a direction generally axially of its direction of rotation.

As the air moves out of the outlet 20 of the vortex chamber 18, it flows through a chamber 25. The chamber 25 may be referred to as a "mixing" chamber. The mixing chamber is defined in part by an oil plate 26 which is suitably secured to the vortex member 16. A suitable fluid gasket 27 is interposed between the oil plate 26 and the vortex member 16. The oil plate 26, gasket 27, and vortex member 16 define an oil chamber 28 into which oil is directed from the reservoir 11.

The oil stored in the reservoir 11 is directed into the chamber 28 by a siphon tube 30 which extends downwardly into the reservoir 11. The siphon tube 30 is connected by a fluid passageway 31 with a fluid passageway 32 which communicates with the chamber 28, as best seen in FIG. 3. The fluid in the reservoir 11 flows upwardly in the siphon tube 30 through the passageways 31, 32 into the chamber 28.

As the rotating mass of fluid exits from the outlet 20 of the vortex chamber 18, it flows through the mixing chamber 25 and past the oil chamber 28. The oil chamber 28 is open or in communication with this rotating mass of fluid. The rotating mass of fluid, as it flows through the chamber 25 creates a suction area on the outer periphery thereof, as well as in the interior thereof. The suction created by the high speed of rotation of the mass of air draws oil from the chamber 28 thereinto. The oil which is drawn into the mass of fluid is sheared due to the high rotational velocity of the fluid and is formed into small particles in the mixing chamber 25 and is entrained by the flow of the fluid, as is known. The oil plate 26 has an oil plate orifice 35 at the lower end thereof which defines an outlet through which the rotating mass of fluid flows from the mixing chamber 25.

As the rotating flow of fluid exits from the outlet or oil plate orifice 35 a portion of the fluid impacts against a particle size regulator disc or member 40. The member 40 is located in the path of movement of the rotating flow of fluid, and is supported by a baffle plate support member 41 which is spaced from the oil plate 26. The member 40 is adjustably secured to the plate member 41, such as by a threaded fastener and nut 32.

The member 40 comprises a mist density adjustment means which is operable upon movement relative to the vortex outlet to vary the mist density. As the member 40 is moved with respect to the vortex outlet 20 the size ranges of oil particles in the mist will vary, that is, as the member 40 is moved toward the vortex outlet 20, a high percentage of the oil particles will be of mist size. Additionally, the movement of the member 40 varies the suction created by the rotating mass of fluid as it flows through the mixing chamber.

It has been discovered that by moving the member 40 toward the vortex outlet 20, the vacuum in the mixing chamber 25 is increased. Conversely, when the member 40 is moved away from the vortex outlet, the vacuum in the mixing chamber 25 is decreased, thus resulting in a reduced flow rate and a less efficient particalization of the oil contained in the fluid.

The oil mist generator 10 has an oil gap, designated A in the drawings which extends from the inside edge of the oil plate 26 to the vortex outlet 20, as measured in the direction of flow of the rotating body of fluid. It has been discovered that dimension A of the oil gap has a critical relationship with respect to the diameter of the outlet 20 of the vortex chamber 18 in vortex nozzle systems wherein a member 40 is not used. However, by utilizing a member 40 criticality of this oil gap diminishes. In the present embodiment the oil gap A is of a length approximately ¾ the diameter of the outlet 20 of the vortex chamber 18. This dimensional relationship provides a very successful vortex mist generating system when used in combination with the member 40.

Figure 9:
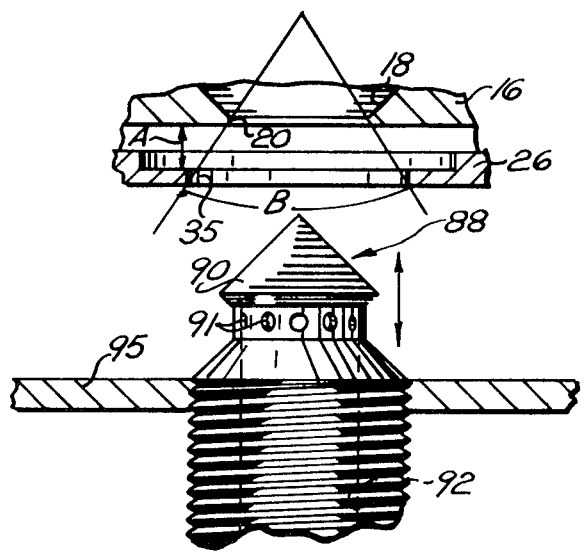
FIG. 9 shows yet another modification of the present invention.

Furthermore, it has been found that the diametrical relationships between the vortex outlet 20 and the oil plate orifice 35 is critical. In referring to FIG. 9 there is shown a jet angle relationship B which angle is defined by a pair of co-planar lines each touching the outer edge of the vortex outlet 20 and the oil plate orifice 35 and intersecting the central axis of the vortex chamber 18. If the vortex outlet 20 and the oil plate orifice 35 have a diametrical relationship which defines a jet angle B in the range of 60°–80° and is used in combination with a member 40, an extremely fine mist is created. It has been observed that when the angular relationship between these two members is less than 60° or more than 80°, the mist output is substantially reduced. Coincident with this mist reduction is a substantial reduction in suction within the chamber. By a suitable choice of diameters for the outlet orifice 20 and the oil plate orifice 35 and coupled with the regulation of the height of the gap A between member 40 and the base of oil plate 26, conditions can be established which will effectively mist a wide range of oils having varying viscosities and misting characteristics.

After a portion of the rotating air mass and oil particles which are entrained in the air mass have been impacted against the plate or member 40, the particles flow laterally outwardly in the direction indicated by the arrows in FIG. 5. This is a direction generally radially of the rotating fluid mass. As the mist continues to flow, it encounters a baffle plate in the form of a solid plate or screen, generally designated 50. The baffle plate 50 is secured to the support member 41 and to the vortex member 16. The large mist particles that strike the baffle plate 50 will drop back into the reservoir 11. The mist, however, will flow around baffle plate 50, into the mist conduit outlet 60, and through the conduit to the device to be lubricated. The member 41 is a bar member which does not interfere with the flow of the mist around the baffle.

In addition to the mist density control, the mist generator 10 includes an air control valve, generally designated 70, and which is adjustable from the top of the mist generator. The valve 70 is of a conventional construction and functions in a well-known manner in this art and reference may be made to copending application, Pat. No. 3,515,676 for a description of the operation and function thereof. Insofar as the present application is concerned, upon opening of the valve 70, fluid may be by-passed from the inlet 13 directly into the mist outlet 60 through passageway 71. In this manner, the valve 70 serves to increase manifold pressure and flow for better reclassification.

Also, the mist generator 10 includes a valve construction, generally designated 75, for controlling the oil flow into the oil chamber 28. The valve 75 is located in a passageway 76 which communicates with the mist outlet 60 and with the oil chamber 28. By opening the valve 75, mist can flow directly from the mist outlet down into the chamber 28, thus decreasing or spoiling the vacuum created by the rotating fluid flow. If an excessive amount of suction is created thereat, an excessive amount of liquid is drawn into the chamber 28 causing flooding of the unit. This tends to minimize this possibility. Particularly with the member 40 also functioning to control suction acting on the oil in the oil gap, the possibility of flooding is greatly minimized. It should be understood that the valve 75 may be adjusted to a number of different positions to allow a predetermined amount of mist to be supplied to the oil chamber 28. Alternatively, the passageway 76 could be diverted to intersect passagaway 31 at the top of oil suction tube 30, thus providing better "spoiling" action at the top of the suction tube rather than in chamber 28, where the "spoiling" action is less effective due to the tremendous suction in this area.

FIGS. 6–9 illustrate modifications of the present invention which may be embodied in the design shown in FIG. 1. FIG. 6 illustrates a modification in which the vortex opening or outlet 20 is provided with a plurality of serrations 80 around the periphery thereof. As shown in FIG. 6, there are four serrations 80 located at approximately 90 degrees apart formed in the outlet 20 of the vortex chamber 18. These serrations operate to provide a turbulent fluid flow which tends to increase the particalizing effect of the rotating fluid as the rotating mass of fluid exits from the vortex chamber 18. These serrations are particularly useful for oils which do not easily particalize due to their unique chemical composition.

FIG. 7 illustrates an embodiment of the present invention where the plate 40 for controlling the mist density and the suction in the mixing chamber 25 may be adjusted externally of the head 12 of the mist generator 10. In this embodiment, the member 40 is supported on a rod 85 which extends through the vortex outlet 20 and through the head 12 of the mist generator 10 to the exterior thereof. A suitable micrometer adjustment mechanism 84 is provided in association with the rod and permits adjustment of the member relative to the outlet of the vortex chamber from the exterior of the unit. In this manner, a fine adjustment exteriorly of the mist generator 10 con be effected in order to control the mist density.

As shown in FIG. 8, the configuration of the member 40 can be varied so as to facilitate and control the flow of fluid thereacross. As schematically shown in FIG. 8, the member 40 is illustrated which has a plurality of vanes 86 thereon, namely, three in number which are located at 120 degrees relative to each other. These vanes are engaged by the rotating flow of fluid and chop or cut the rotating flow of fluid. This results in impact of the particles of oil against the lateral surfaces of the vanes 86 as well as the base **40*a* of member 40. Thus, further particalizing of the particles is effected due to this impacting of the oil against the vanes 86. Moreover, these vanes 86 effect and assist in guiding the flow of air with the particles entrained therein outwardly of the member 40 and the baffle plate 50**.

FIG. 9 shows a further modification of the present invention in which, in addition to the oil gap A which is provided for locating oil adjacent to the periphery of the rotating column or moving mass of air, oil is directed interiorly thereof. The rotating mass of fluid forms a suction not only around the periphery thereof due to the high velocity of rotation of the mass, but also internally thereof, as is known.

In the embodiment shown in FIG. 9, a suitable mechanism 88 is provided for directing oil into the low pressure interior of the rotating column of air. This means 88 is provided by a cone 90 which projects centrally of the vortex outlet 20 and into a position interiorly of the rotating mass of air. The cone 90 is hollow in construction and has a plurality of outlets 91 which are in communication with the reservoir 11 of oil through passageway 92. As the column of air rotates past the openings 91 in the cone member 90, the suction draws oil up through the passageway 92 from the reservoir 11 and out through the openings 91 thereof into the column of air. As a result, the air is drawing oil, not only from the oil gap A, but also from the openings 91 of the cone 90. As a result, a high volume of oil is drawn into the rotating column of air in order to effectively provide a high mist density.

It should be apparent that in the modification of FIG. 9, a mist control member 95 is associated with the cone member 90 and operates in the manner of plate 40 of the embodiment. The cone member 90 and member 95 are relatively adjustable in order to effect the proper positioning thereof relative to the vortex outlet 20 to thereby control the mist density in a manner similar to that described in connection with member 40.

Having thus described my invention, I claim:

1. Apparatus for generating a liquid particle suspension in a fluid carrier comprising means for creating a rotating flow of fluid moving in a direction generally axially of the direction of rotation thereof, said means comprising a vortex chamber having an inlet and an outlet, means defining a liquid and fluid carrier mixing chamber adjacent said outlet of said vortex chamber, means defining a liquid chamber communicating with said mixing chamber, said rotating fluid flow drawing liquid from said liquid chamber thereinto as the rotating fluid moves through said mixing chamber, and mist density adjustment means located in the path of movement of said rotating flow of fluid and movable toward and away from said vortex outlet to vary the size of the liquid particles in the fluid carrier.

2. Apparatus as defined in claim 1 wherein said mist density adjustment means comprises a member aligned with said outlet of said vortex chamber and against which said fluid impacts after drawing liquid thereinto.

3. Apparatus as defined in claim 2 wherein said member effects a change in the direction of movement of said rotating fluid and directs said fluid radially of its direction of rotation.

4. Apparatus as defined in claim 3 further including a baffle member located in the path of the fluid after it encounters said member and around which the fluid flows.

5. Apparatus as defined in claim 3 wherein said mist density adjustment means includes a mist density support located below said member and said vortex outlet and means for adjustably supporting said member on said support.

6. Apparatus as defined in claim 3 wherein said mist density adjustment means includes an adjusting member connected with said member and which extends externally of the apparatus to provide for adjustment of said member externally of the apparatus.

7. Apparatus as defined in claim 3 wherein said member includes a plurality of vanes which extend radially of the direction of rotation of the fluid.

8. Apparatus as defined in claim 3 wherein said member includes a cone located centrally with respect to said vortex outlet and having at least one opening for delivering additional liquid particles to the fluid carrier internally thereof.

9. Apparatus as defined in claim 3 wherein said member has a portion against which the liquid particles impact to decrease the size of the liquid particles thereby.

10. Apparatus as defined in claim 3 wherein the size of the liquid particles in the fluid carrier increases as said member moves away from said outlet of said vortex chamber.

11. Apparatus as defined in claim 1 wherein said vortex outlet has at least one serration therein for creating turbulence in the rotating fluid.

12. Apparatus for generating a liquid particle suspension in a fluid carrier comprising means for creating a rotating flow of fluid moving in a direction generally axially of the direction of rotation thereof, said means comprising a vortex chamber having an inlet and an outlet, means defining a liquid and fluid carrier mixing chamber adjacent said outlet of said vortex chamber, a liquid chamber adjacent said outlet of said vortex chamber and being open to said mixing chamber, said rotating fluid flow creating a vacuum for drawing liquid from said liquid chamber thereinto as the rotating fluid moves thereby, and a member located in the path of movement of said rotating flow of fluid and adjustable toward and away from said vortex outlet to control said vacuum created by said rotating fluid flow thereby controlling suspended liquid particle density in said liquid particle suspension.

13. Apparatus as defined in claim 12 wherein said member effects a change in the direction of movement of said rotating fluid and directs said fluid radially in the direction of its rotation.

14. Apparatus as defined in claim 12 further including adjustment means for adjusting said member relative to said vortex outlet to control said vacuum created by said rotating fluid.

15. Apparatus as defined in claim 13 further including a baffle member located in the path of the fluid after it encounters said member and around which the fluid flows.

16. Apparatus as defined in claim 14 wherein said adjustment means includes a mist density support located below said member and said vortex outlet and means for adjustably supporting said member on said support.

17. Apparatus as defined in claim 14 wherein said adjustment means includes an adjusting member which extends externally of the apparatus.

18. Apparatus as defined in claim 14 wherein said member includes a plurality of vanes which extend radially of the direction of rotation of the fluid.

19. Apparatus as defined in claim 14 further including means for directing fluid internally of the rotating flow of fluid.

20. Apparatus for generating a liquid particle suspension in a fluid carrier comprising means for creating a rotating flow of fluid moving in a direction generally axially of the direction of rotation thereof, said means comprising a vortex chamber having an outlet of a predetermined diameter, means defining a liquid gap having a predetermined length measured in the direction in which said fluid moves, said rotating fluid flow drawing liquid from said gap thereinto as the rotating fluid moves therethrough, an exit orifice through which fluid flows from said liquid gap, the dimensional relationship of said vortex chamber outlet, said liquid gap and said exit orifice being such that coplanar lines intersecting the diameter of said vortex chamber outlet and said exit outlet form an angle of 60 to 80 degrees, and a particle size regulator member located in the path of movement of said rotating mass of fluid as it exits from said exit orifice.

21. Apparatus as defined in claim 20 wherein said vortex chamber is defined by a vortex member and an oil plate member secured to said vortex member and defining said liquid gap.

22. Apparatus as defined in claim 20 further including a baffle member located in the path of the fluid after it encounters said member and around which the fluid flows.

References Cited

UNITED STATES PATENTS

| | | | |
|---|---|---|---|
| 3,515,676 | 6/1970 | Hierta et al. | 252—359 |
| 2,753,013 | 7/1956 | Tear | 184—55 |
| 3,064,760 | 11/1962 | Shada | 184—55 |
| 3,085,654 | 4/1963 | Friedell et al. | 184—55 |
| 3,223,394 | 12/1965 | Walsh | 261—78 |
| 3,411,609 | 11/1968 | German | 261—78X |
| 3,439,777 | 4/1969 | Gothberg | 184—55 |

MANUEL A. ANTONAKAS, Primary Examiner

U.S. Cl. X.R.

184—55A; 252—359R; 261—78A